US005717875A

United States Patent [19]
Cutlerywala et al.

[11] Patent Number: 5,717,875
[45] Date of Patent: Feb. 10, 1998

[54] COMPUTING DEVICE HAVING SEMI-DEDICATED HIGH SPEED BUS

[75] Inventors: Huzefa H. Cutlerywala, Tempe; Rajeev Jayavant, Phoenix; Judson A. Lehman, Scottsdale, all of Ariz.

[73] Assignee: VLSI Technology, Inc., San Jose, Calif.

[21] Appl. No.: 532,936

[22] Filed: Sep. 22, 1995

[51] Int. Cl.⁶ .................................................. G06F 13/40
[52] U.S. Cl. ................................. 395/308; 395/280
[58] Field of Search ..................................... 395/800, 308, 395/280, 306

[56] References Cited

U.S. PATENT DOCUMENTS

| | | | |
|---|---|---|---|
| 4,967,375 | 10/1990 | Pelham | 395/515 |
| 5,455,915 | 10/1995 | Coke | 395/293 |
| 5,542,053 | 7/1996 | Bland | 395/309 |

*Primary Examiner*—Eric Coleman
*Attorney, Agent, or Firm*—Burns, Doane, Swecker & Mathis LLP

[57] ABSTRACT

An improved bus architecture is provided in which the bus connects a single master to multiple targets including one primary target. Bus usage is predominately between the master and one primary target at a very high data transfer rate. Traffic between the master and other secondary targets has a much lower bandwidth requirement. The bus uses a single frequency clock for transfers involving the primary target and transfers involving the secondary targets. In accordance with one embodiment of the invention, the master is connected to the primary high bandwidth target using a high speed protocol and separate read and write data paths which are always driven (i.e., never tri-stated). Always driving the high speed data paths avoids the increased area and decreased performance that would be entailed by adding additional gating. The lower bandwidth targets are supported on a single bi-directional data path to minimize area. This lower bandwidth path has a different protocol and is only activated upon command from the master in order to reduce power dissipation. This construction is different from a bus bridge in that the master specifically initiates activity on the low bandwidth bus, based on the target's address. The master knows which path will process a cycle, and cycles are completed differently for each path.

12 Claims, 5 Drawing Sheets

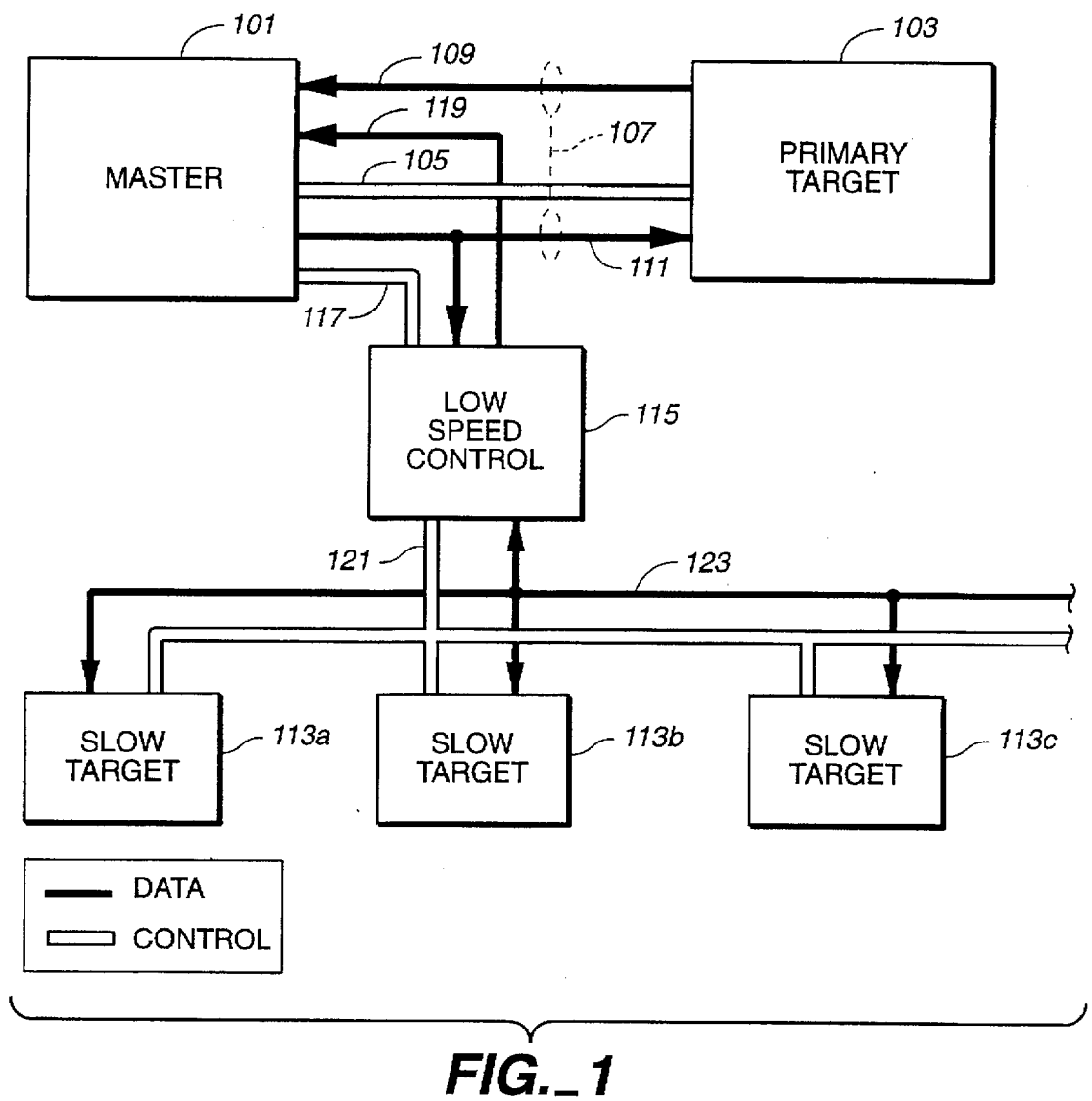
FIG._1

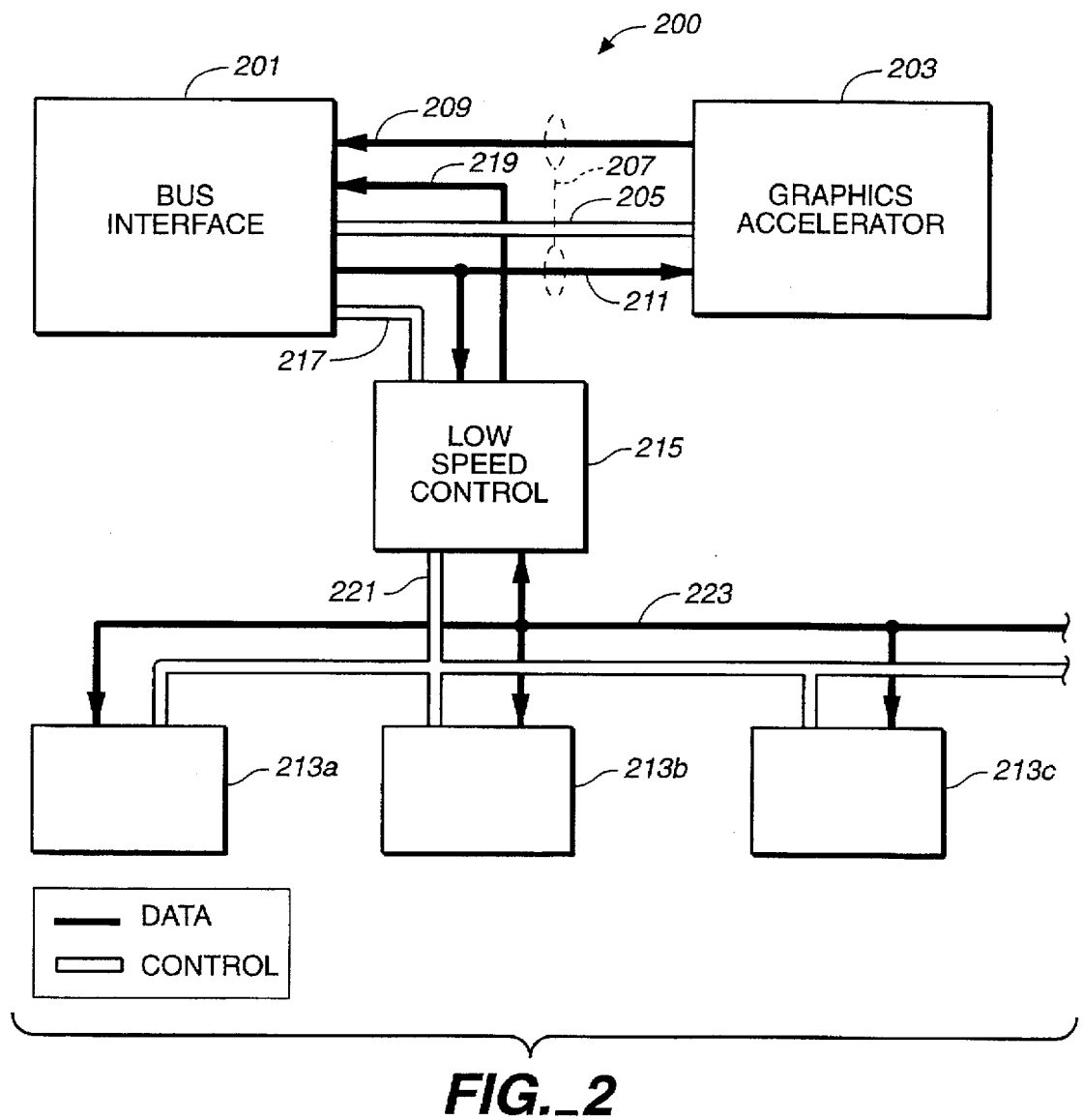
FIG._2

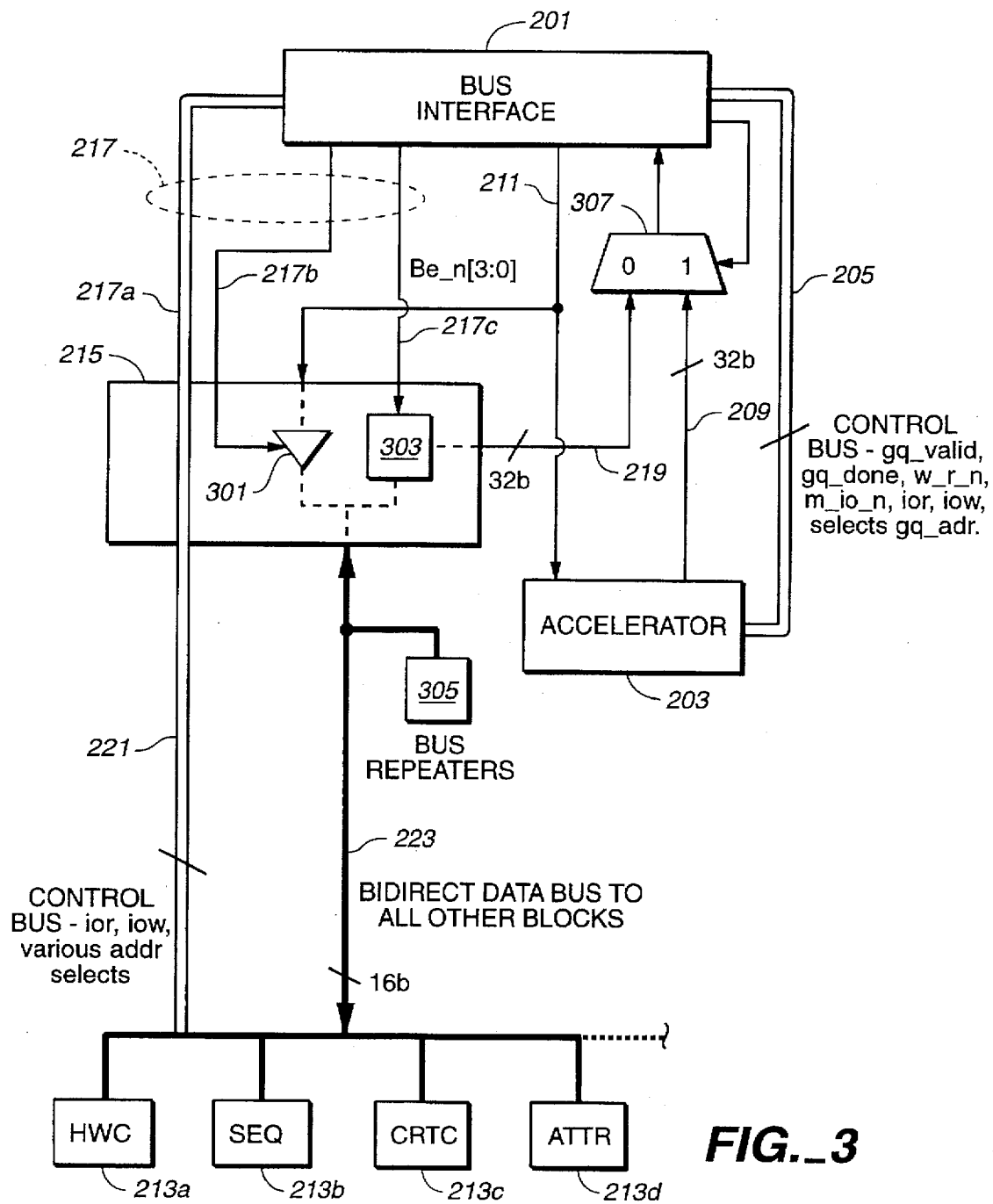
FIG._3

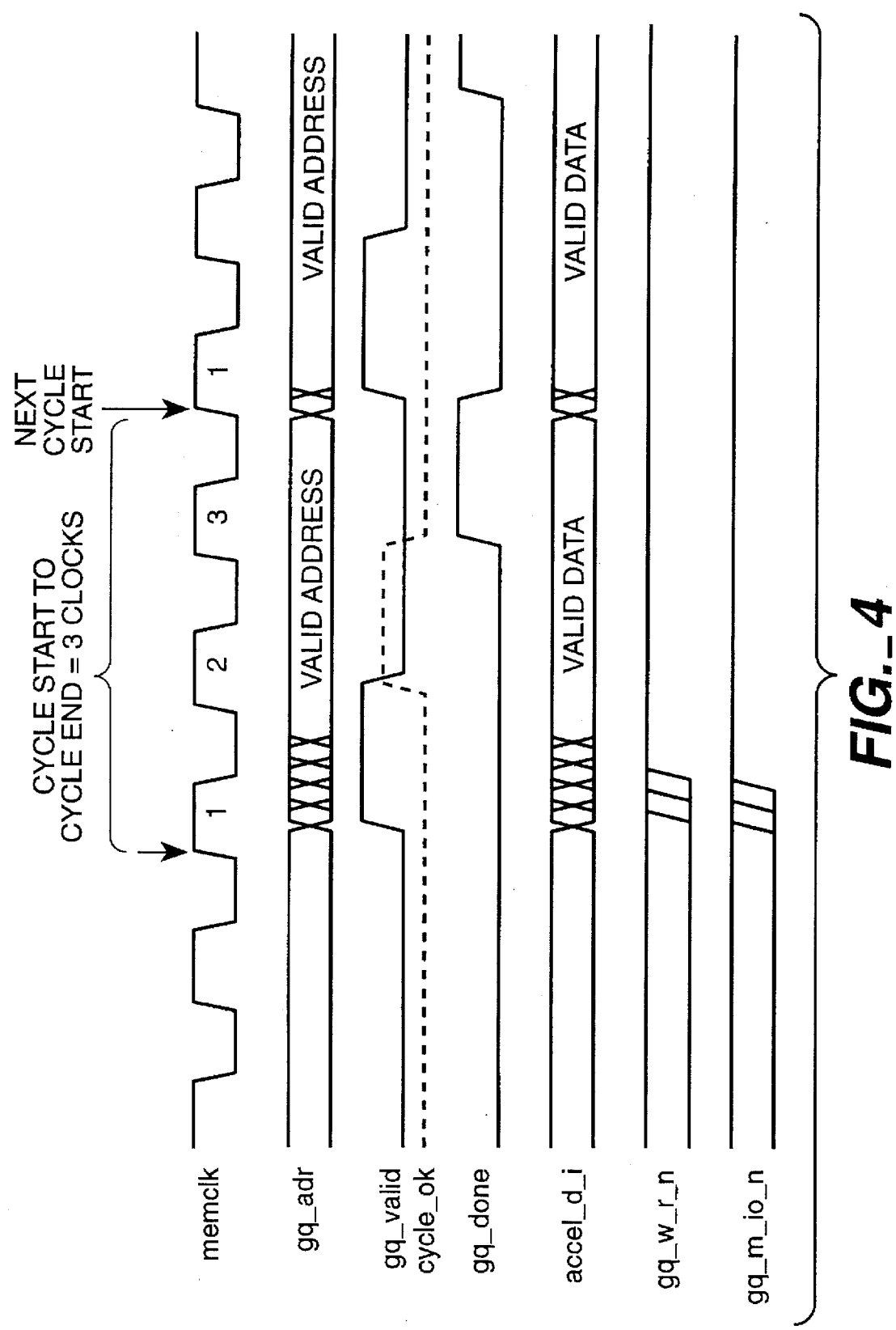
FIG._4

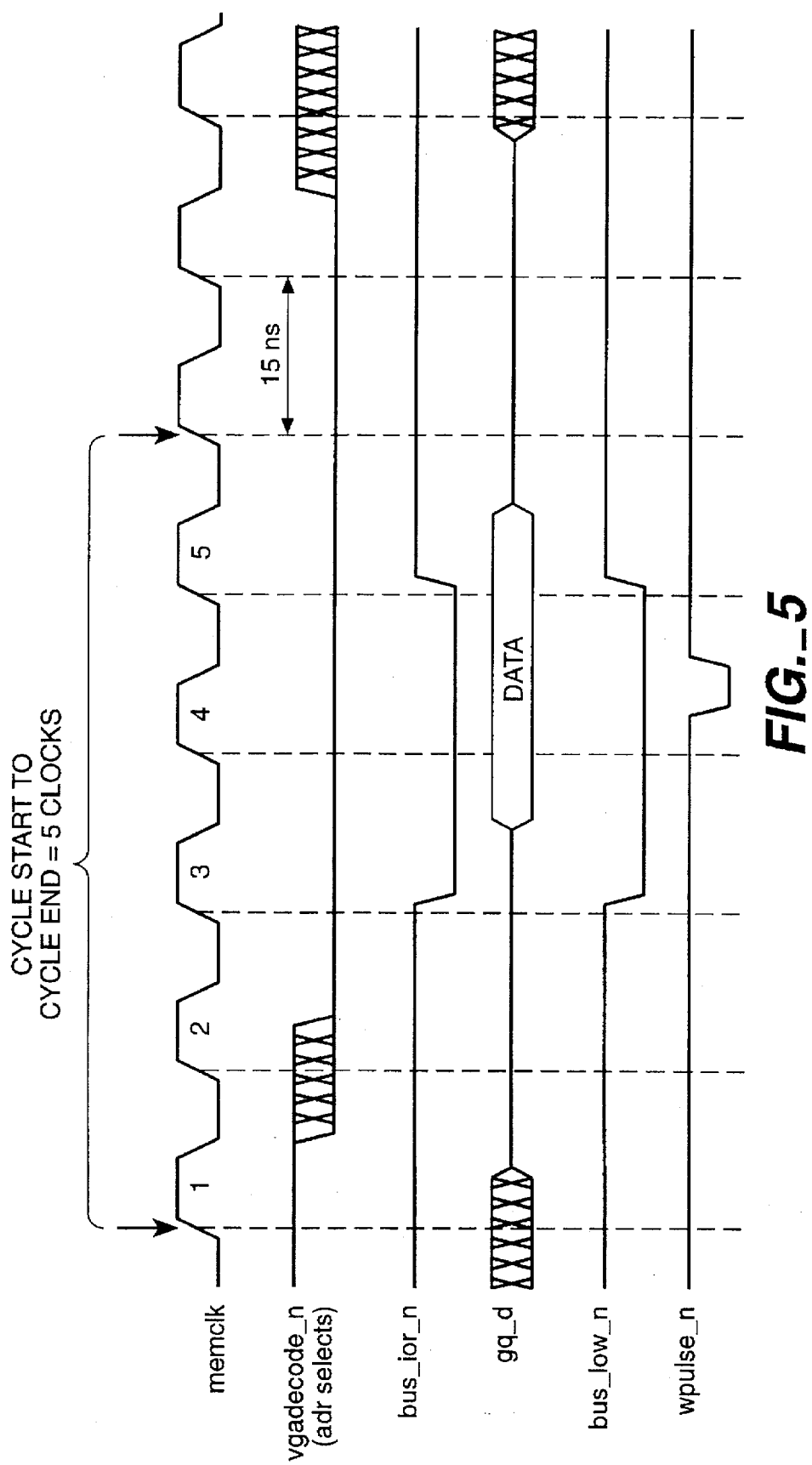
FIG._5

COMPUTING DEVICE HAVING SEMI-DEDICATED HIGH SPEED BUS

BACKGROUND OF THE INVENTION

1. Field of the Invention

The present invention relates to computer bus architectures, particularly to a graphics bus for a hardware graphics accelerator.

2. State of the Art

In computer systems, a bus is commonly used to communicate between logical blocks or devices. The devices connect to a common communications medium, such as a set of wires, or printed circuit board traces. The rules that govern the access of devices to the bus and data transfer on the bus constitute the bus protocol. Generally, all devices on a bus must use the same protocol.

A device connected to the bus may be a master, a slave, or both. A master uses the system bus to issue requests for service to one or more slaves. A slave uses the system bus to respond to requests for service from different masters. A device may at one time issue a request for service and at another time respond to a request for service, thereby functioning as either a master or a slave. Buses with multiple master have means for arbitrating between them.

In a typical bus implementation, a set of traces are embedded in one or more printed circuit boards. Devices connect to the bus through bus transceivers. Devices connected to a bus may all reside on the same printed circuit board. Such an arrangement is typical of system buses for small computer systems, i.e., personal computers and computer workstations. Alternatively, a bus may reside entirely on a single integrated circuit. In the case of a typical hardware graphics accelerator, for example, various functional units are connected together by an on-chip bus. These functional units may include a memory controller, an accelerator unit, a CRT controller, a RAMDAC, a clock synthesizer, etc.

Not all of the functional units connected to a bus will have the same requirements in terms of speed and frequency of bus access. Bus architecture involves various tradeoffs to ensure that overall system performance is optimized, within reasonable size and power constraints. As present trends toward multimedia computing and mobile computing continue there exists a need for an improved bus architecture, particularly for hardware graphics accelerators, that offers increased speed and decreased power consumption. The present invention addresses this need.

SUMMARY OF THE INVENTION

The present invention, generally speaking, provides an improved bus architecture in which the bus connects a single master to multiple targets, or slaves, including one primary target. Bus usage is predominately between the master and one primary target at a very high data transfer rate. Traffic between the master and other secondary targets has a much lower bandwidth requirement as compared to the traffic between the master and the primary target. The bus uses a single frequency clock for transfers involving the primary target and transfers involving the secondary targets. In accordance with one embodiment of the invention, the master is connected to the primary high bandwidth target using a high speed protocol and separate read and write data paths which are always driven (i.e., never tri-stated). Always driving the high speed data paths avoids the increased area and decreased performance that would be entailed by adding additional gating to tri-state the bus going to the primary target. The lower bandwidth targets are supported on a single bi-directional data path to minimize area. This lower bandwidth path has a different protocol and is only activated upon command from the master in order to reduce power dissipation. This construction is different from a bus bridge in that the master specifically initiates activity on the low bandwidth bus, based on the target's address. (In the case of a bus bridge, commands are broadcast to all targets on the bus.) The master knows which path will process a cycle, and cycles are completed differently for each path.

BRIEF DESCRIPTION OF THE DRAWING

The present invention may be further understood from the following description in conjunction with the appended drawing. In the drawing:

FIG. 1 is a block diagram of a bus architecture in accordance with the present invention;

FIG. 2 is a block diagram of a specific application of the bus architecture of FIG. 1;

FIG. 3 is a more detailed block diagram of portions of the bus architecture of FIG. 1, showing the signal lines of the control buses;

FIG. 4 is a timing diagram illustrating timing of a transaction on the high speed bus of FIG. 3; and FIG. 5 is a timing diagram illustrating timing of a transaction on the low speed bus of FIG. 3.

DETAILED DESCRIPTION OF THE PREFERRED EMBODIMENTS

Referring now to FIG. 1, a bus architecture in accordance with the present invention is shown. In a preferred embodiment, the bus architecture of FIG. 1 is realized on a single integrated circuit, for example a hardware graphics accelerator. The bus architecture is broadly applicable, however, to other configurations including buses formed on printed circuit boards.

A master 101 is connected to a primary target 103 by a control bus 105 and by a high speed data bus 107 including a unidirectional read path 109 and a unidirectional write path 111. The master 101 is connected to slow targets 113a, 113b, 113c through a low speed control block 115. In particular, the master 101 is connected to the low speed control block 115 by a control bus 117, by a unidirectional read path 119 separate from the unidirectional read path 109, and by the same unidirectional write path 111 as connects the master 101 and the primary target 103. The read paths 109, 119 connected to the primary target 103 and the low speed control block 115 are separated to avoid contention and the need for a contention resolution mechanism that would slow down the read path from the primary target 103 to the master 101. The write path 111 may be shared by the primary target 103 and the low speed control block 115 because it is driven only by the master 101. Hence the problem of contention does not arise.

The low speed control block 115 is connected to the slow targets 113a, 113b, 113c by a control bus 121 and by a single bi-directional datapath 123.

The bus architecture of FIG. 1 allows communications between the master 101 and the primary target 103 to be optimized. The read path 109 is dedicated to transfers from the primary target to the master and is always driven. The write path 111 is shared by the primary target and the low speed control block, but is also always driven. Preferably, the read path 109 and the write path 111 are each at least 32 bits wide. Together, the read path and the write path comprise a semi-dedicated high speed bus 107 that enables the bulk of bus transactions to be performed at high speed. Preferably, whether in a single-chip implementation or a circuit board implementation, the primary target 103 is located as near as possible to the master 101, reducing the length of the read path 109 and the write path 111 so as to achieve the highest possible speed of operation, and least power dissipation.

Accesses to slow targets 113a, 113b, 113c through the low speed control block 115 occur infrequently and may therefore be performed at low speed without appreciably affecting overall system performance. By partitioning off the datapath 123 to the slow targets 113a, 113b, 113c from the datapath 107 to the primary target 103, high performance, achieved at a premium in terms of area and power, may be focused where it is needed, and where high performance is not required, economies may be achieved without impacting performance of the datapath 107. The datapath 123 may be bi-directional, economizing on area. A bi-directional bus would not be suitable for the datapath 107 because of bus turn around time, which would considerably reduce performance. Similarly, the datapath 123 may be narrower than the datapath 107, for example 16 bits instead of 32 bits. If a single bus were to be used between both the primary target 103 and the slow targets 113a, 113b, 113c, although less area would be required, bus loading would prevent high speed operation for transfers between the master 101 and the primary target 103. Furthermore, power consumption would be increased, since the increased load would have to be driven on every transfer.

Referring to FIG. 2, in a specific application of the bus architecture of FIG. 1, the master is a bus interface (or graphics bus driver) 201, of a graphics device 200, the primary target is a graphics accelerator 203, and the slow targets include, for example, a CRT controller, an attribute controller, and RAMDAC controller, a sequencer, a hardware cursor, etc. The write datapath is an Accelerator Write Bus 211, and the read datapath is an Accelerator Read Bus 209. In this environment, the advantages achieved by the partitioned bus include the following:

Writes to the accelerator 203 are faster because the Accelerator Write Bus 211 is unidirectional and has lighter loading.

Reads from the accelerator 203 are faster because the Accelerator Read Bus 209 is unidirectional and has lighter loading.

Reads from the accelerator 203 dissipate less power because the entire write path 211, 223 does not have to be driven.

Separate Accelerator Read and Write Buses 209, 211 save the "turn-around" time required in a bi-directional data bus.

The state of the bi-directional databus 223 is not changed for accelerator cycles, saving power.

One disadvantage of the partitioned bus architecture is that the additional Accelerator Read and Write Buses 209, 211 require more area than would a single bi-directional bus. This disadvantage may be minimized, however, by placing the accelerator 203 close to the graphics bus driver 201.

The low speed control block 215 is essentially just a "dumb" data buffer. Referring more particularly to FIG. 3, the bus interface 201 is connected to the accelerator 203 by a control bus 205 and by a high speed data bus including a unidirectional read path 209 and a unidirectional write path 211. The control bus 205 includes various signal including signals indicating an access as being a read or a write to memory or to I/O, various select signals, a graphics queue address, and graphics queue control signals. The exact nature of these signal is not important to the present invention. The bus interface 201 is connected to slow targets 213a, 213b, 213c, 213d, etc., (shown to be, for example, a hardware cursor, a sequencer, a CRT controller, and an attribute controller, respectively) through the low speed control block 215. In particular, the bus interface 201 is connected to the low speed control block 215 by a control bus 217, by a unidirectional read path 219 separate from the unidirectional read path 209, and by the same unidirectional write path 211 as connects the bus interface 201 and the accelerator 203. The low speed control block 215 is connected to the slow targets 213a, 213b, 213c, 213d by a control bus 221 and by a single bi-directional datapath 223. Bus repeaters 305 may be employed as necessary depending on the number and location of blocks 213.

The control bus 217 includes buses 217a, 217b and 217c. The bus 217a passes through the low speed control block 215 unchanged and includes I/O read and write signals as well as various address select signals. The buses 217b and 217c are input to the low speed control block 215 and control its operation.

The low speed control block 215 includes a buffer 301 connected between the unidirectional write path 211 and the bi-directional bus 223, and a byte mapping circuit 303 connected between the bi-directional bus 223 and the unidirectional read path 219. The bus 217b may be a single control line used to enable the buffer 301 when the bus interface directs an operation to one of the slow secondary targets 213. Normally, the buffer 301 is disabled. The bus 217c carries byte enable signals Be_n[3:0]. In a preferred embodiment, the bi-directional bus 223 is 16 bits. When the bus interface 201 performs a read from the bi-directional bus 223, the 16 bits of this bus are mapped to 32 bits based on the byte enable signals.

A multiplexer 307 selects between the unidirectional read path 209 and the unidirectional read path 219 in accordance with whether the read operation is from the accelerator 203 or from the "back end" (blocks 213).

The high speed data bus and the bi-directional data bus have different protocols. In particular, the Accelerator Read and Write Buses 209, 211 have variable duration cycles, ending upon receipt of a "done" signal. The cycles on the bi-directional data bus 223 have a fixed duration with an implied "done" signal. A graphics queue controller (not shown) within the bus interface 201 of FIG. 3 knows, by decoding a command address, which bus a particular cycle is for. If the cycle is for the high speed data bus 207, only the high speed data bus is driven. If the cycle is for the bi-directional data bus 223, both the bi-directional data bus 223 and the high speed data bus 207 are driven. Data driven on the high speed data bus 207 is ignored by the accelerator 203 based on a control signal from the graphics bus driver 201 to the accelerator 203. However, always driving the high speed data bus 207 maximizes the performance of the bus, because the bus transceivers never need to be enabled. As a result, the transceiver turn on time associated with other bus architectures is not incurred.

The protocols of the two buses 207, 223 in accordance with a preferred embodiment will be described in greater detail with reference to FIG. 4 and FIG. 5.

Referring first to FIG. 4, illustrating a write cycle from the bus interface 201 to the accelerator 203, during a first clock cycle, clock 1, valid address and data information is presented on the bus 211, and a gq_valid signal is asserted to indicate to the accelerator a valid request. The type of request, read or write and memory or I/O, is indicated by the signals gq_w_r_n and gq_m_io_n, also asserted during the first cycle. During the clock 2, the accelerator processes the request, generating an internal cycle_ok signal. During the clock 3, the accelerator returns a gq_done signal to the bus interface 201 to indicate that the request has been complete. FIG. 4 shows the fastest high speed path cycle (three clocks). Other write or read accesses may take longer depending on the previous cycle. For example, a write cycle may cause the accelerator to draw a line, in which case the accelerator will not indicate completion of the write cycle until the drawing operation has been completed.

Referring to FIG. 5, in the case of the bi-directional bus 223, cycles are of fixed duration, in the illustrated embodiment five clock cycles. During clocks 1 and 2, address select lines are asserted and decoded by the various blocks 213, causing a vgadecode_n signal within one of the blocks to be asserted. During clock 3, either the signal bus_ior_n signal, indicating a read, or the bus_iow_n signal, indicating a write, is asserted, along with data (gq_d) being asserted on the bus 223.

In some instances, a low byte of data may be used to indicate an index value and a high byte of data may contain the actual value to be written to the index location. Therefore, clock 3 allows time for the selected block to decode a possible index value.

Actual data is written or read during clock 4. In the case of a write cycle, the block generates an internal write pulse, wpulse_n. The cycle concludes on the following clock, clock 5.

The invention having been thus described, it will be appreciated by those of ordinary skill in the art that the present invention can be embodied in other specific forms without departing from the spirit or essential character thereof. The disclosed embodiments are therefore considered in all respects to be illustrative and not restrictive. The scope of the invention is indicated by the appended claims, and all changes which come within the meaning and range of equivalents thereof are intended to be embraced therein.

What is claimed is:

1. A data processing device comprising:

a bus master;

a first slave device;

a second slave device;

buffer means;

a first data bus operating according to a first protocol connecting said bus master, said first slave device and said buffer means wherein said first data bus comprises a unidirectional write data bus connected to said bus master, said first slave device and said buffer means; and a second data bus operating according to a second protocol connecting said buffer means and said second slave device;

wherein said first protocol allows for higher speed data transfer than said second protocol, and wherein said buffer means is controlled by said bus master.

2. The apparatus of claim 1, further comprising:

a first control bus connected between said bus master and said first slave device; and a second control bus connected between said bus master and said buffer means;

wherein said first control bus and said second control bus each include a clock signal of a same predetermined frequency, and wherein data is transferred and said first data bus and on said second data bus in accordance with said clock signal of said predetermined frequency.

3. The apparatus of claim 1 wherein said first data bus further comprises a first unidirectional read data bus connected to said bus master and to said first slave device only.

4. The apparatus of claim 3, wherein said first data bus further comprises a second unidirectional read data bus connected to said bus master and to said buffer means only.

5. The apparatus of claim 1, further comprising a third slave device connected to said second data bus.

6. The apparatus of claim 1, wherein said second data bus is a bi-directional data bus.

7. The apparatus of claim 1, wherein said first data bus is M bits wide and said second data bus is N bits wide where $M \leq N$.

8. The apparatus of claim 1, wherein said bus master, said first slave device, said second slave device, said buffer means, said first data bus, and said second data bus are all formed on a single integrated circuit.

9. The apparatus of claim 8, wherein said single integrated circuit is a graphics device.

10. The apparatus of claim 9, wherein said first data bus is a graphics bus and said bus master is a graphics bus driver.

11. The apparatus of claim 10, wherein said first slave device is a graphics accelerator.

12. The apparatus of claim 11, wherein said second slave device includes a indexed register file.

* * * * *